(12) United States Patent
Johnsson et al.

(10) Patent No.: US 9,426,836 B2
(45) Date of Patent: Aug. 23, 2016

(54) ENABLING DIRECT TRANSPORT LAYER CONNECTIVITY

(71) Applicant: INTEL IP CORPORATION, Santa Clara, CA (US)

(72) Inventors: Kerstin Johnsson, Palo Alto, CA (US); Alexander Pyattaev, Santa Clara, CA (US)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

(21) Appl. No.: 14/332,533

(22) Filed: Jul. 16, 2014

(65) Prior Publication Data

US 2015/0029936 A1    Jan. 29, 2015

Related U.S. Application Data

(60) Provisional application No. 61/859,121, filed on Jul. 26, 2013.

(51) Int. Cl.
*H04L 12/28* (2006.01)
*H04W 76/02* (2009.01)
(Continued)

(52) U.S. Cl.
CPC .......... *H04W 76/02* (2013.01); *H04J 11/0023* (2013.01); *H04L 5/14* (2013.01); *H04L 69/16* (2013.01); *H04W 4/005* (2013.01); *H04W 16/28* (2013.01); *H04W 24/02* (2013.01); *H04W 24/08* (2013.01); *H04W 36/0066* (2013.01); *H04W 36/0083* (2013.01); *H04W 52/0209* (2013.01); *H04W 72/0413* (2013.01); *H04W 72/082* (2013.01); *H04W 74/0833* (2013.01);
(Continued)

(58) Field of Classification Search
CPC ... H04W 76/023; H04W 4/008; H04W 12/06; H04W 48/18; H04W 84/042; H04L 69/24
See application file for complete search history.

(56) References Cited

U.S. PATENT DOCUMENTS

2002/1493918    10/2002  Soles et al.
2003/0212795 A1* 11/2003  Harris ................ H04L 12/2697
                                                                 709/227
(Continued)

FOREIGN PATENT DOCUMENTS

WO    WO 2013/089452 A1    6/2013

OTHER PUBLICATIONS

Samsung, "Solutions for ProSe Service Continuity", SA WG2 S2-131919, Discussion/Approval, May 2013, Meeting 97, Agenda 6.4, 6 Pages, Busan, South Korea.
(Continued)

*Primary Examiner* — Melanie Jagannathan
(74) *Attorney, Agent, or Firm* — Thorpe North & Western LLP

(57) ABSTRACT

A technology for a user equipment (UE) that is operable to establish direct transport layer connectivity with a selected UE. An internet protocol (IP) address of the UE can be sent to a Proximity Services (ProSe) server. A user application identification (ID) and ProSe server ID of the selected UE can be requested from an application server. A user application ID and ProSe server ID can be received from the application server. A facilitation message can be sent to the ProSe server in communication with the UE, wherein the facilitation message includes a request to facilitate direct transport layer connectivity between the UE and the selected UE for a selected application.

30 Claims, 7 Drawing Sheets

(51) Int. Cl.

| | | |
|---|---|---|
| *H04W 52/02* | (2009.01) | |
| *H04W 4/00* | (2009.01) | |
| *H04L 5/14* | (2006.01) | |
| *H04W 76/04* | (2009.01) | |
| *H04W 36/00* | (2009.01) | |
| *H04W 24/08* | (2009.01) | |
| *H04W 72/08* | (2009.01) | |
| *H04W 72/04* | (2009.01) | |
| *H04W 74/08* | (2009.01) | |
| *H04L 29/06* | (2006.01) | |
| *H04W 24/02* | (2009.01) | |
| *H04W 16/28* | (2009.01) | |
| *H04J 11/00* | (2006.01) | |
| *H04W 84/12* | (2009.01) | |
| *H04W 88/06* | (2009.01) | |
| *H04W 88/08* | (2009.01) | |
| *H04L 5/00* | (2006.01) | |

(52) U.S. Cl.
CPC .......... *H04W76/021* (2013.01); *H04W 76/023* (2013.01); *H04W 76/046* (2013.01); *H04L 5/0007* (2013.01); *H04W 84/12* (2013.01); *H04W 88/06* (2013.01); *H04W 88/08* (2013.01); *Y02B 60/50* (2013.01)

(56) References Cited

U.S. PATENT DOCUMENTS

| | | | |
|---|---|---|---|
| 2005/0076108 A1 | 4/2005 | Li et al. | |
| 2008/0317020 A1* | 12/2008 | Horne | H04L 29/12509 370/389 |
| 2011/0252079 A1* | 10/2011 | Werner | A63F 13/12 709/202 |
| 2011/0252238 A1* | 10/2011 | Abuan | H04L 61/2575 713/168 |
| 2011/0258313 A1 | 10/2011 | Mallik et al. | |
| 2012/0179829 A1* | 7/2012 | George | H04L 61/2564 709/227 |
| 2012/0246301 A1* | 9/2012 | Vyrros | H04L 45/745 709/224 |
| 2013/0016629 A1* | 1/2013 | Mallik | H04W 8/005 370/255 |
| 2013/0064213 A1* | 3/2013 | Park | H04W 76/023 370/329 |
| 2013/0077611 A1* | 3/2013 | Shaikh | H04W 76/023 370/338 |
| 2013/0166759 A1* | 6/2013 | Rajamani | H04W 76/023 709/227 |
| 2013/0288668 A1* | 10/2013 | Pragada | H04W 12/06 455/426.1 |
| 2015/0087233 A1* | 3/2015 | Kim | H04W 76/023 455/41.2 |

OTHER PUBLICATIONS

3GPP TR 23.703, "Study on Architecture Enhancements to Support Proximity Services (ProSe)", Technical Specification Group Services and System Aspects, Jun. 2013, Release 12, V. 0.4.1, Valbonne, France.

Samsung, "Solutions for ProSe Service Continuity", SA WG2 S2-132546, Jul. 2013, Meeting 98, Agenda 6.4, Rel. 12, Valencia, Spain.

Search Report for International application PCT/US2014/047428 mailing date Nov. 3, 2014, 15 pages.

* cited by examiner

ENABLING DIRECT TRANSPORT LAYER CONNECTIVITY

RELATED APPLICATIONS

This application claims the benefit of and hereby incorporates by reference U.S. Provisional Patent Application Ser. No. 61/859,121, filed Jul. 26, 2013.

BACKGROUND

Internet Protocol (IP) Version 4 (IPv4) is a fourth revision of internet protocols used for data communication over different kinds of networks. Primarily, IPv4 is used to route traffic on the Internet and can be used to provide an Internet addressing architecture for establishing connections between network-enabled devices by providing an identification (ID) for each device.

IPv4 uses 32-bit (4-byte) IP addresses to ID each device. Accordingly, the number of IP address spaces is limited to 4,294,967,296 possible unique IPv4 addresses. With an increase in the number of network-enabled devices, the number of unique IP addresses available for use is nearly exhausted. Additionally, some IPv4 addresses have been reserved for special purposes such as private networks, multicast IPv4 addresses, and special organizations, thereby further reducing the number of available unique IP addresses.

A private network is a network that uses private IP addresses, following standards such as RFC 1918 for Internet Protocol Version 4 (IPv4), to identify devices within the network. Private IP addresses can be used for home, office, and enterprise local area networks (LANs), when globally routable addresses are not required or are not available. Since private IPv4 addresses are not globally unique, the private IPv4 addresses are not globally reachable by devices outside of the private network. As a result, direct IP connectivity is not possible between devices with private IPv4 addresses unless they are within the same private network. Additionally, direct IP connectivity is not possible between devices with public IPv4 addresses as well when the devices are behind firewalls that limit access.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
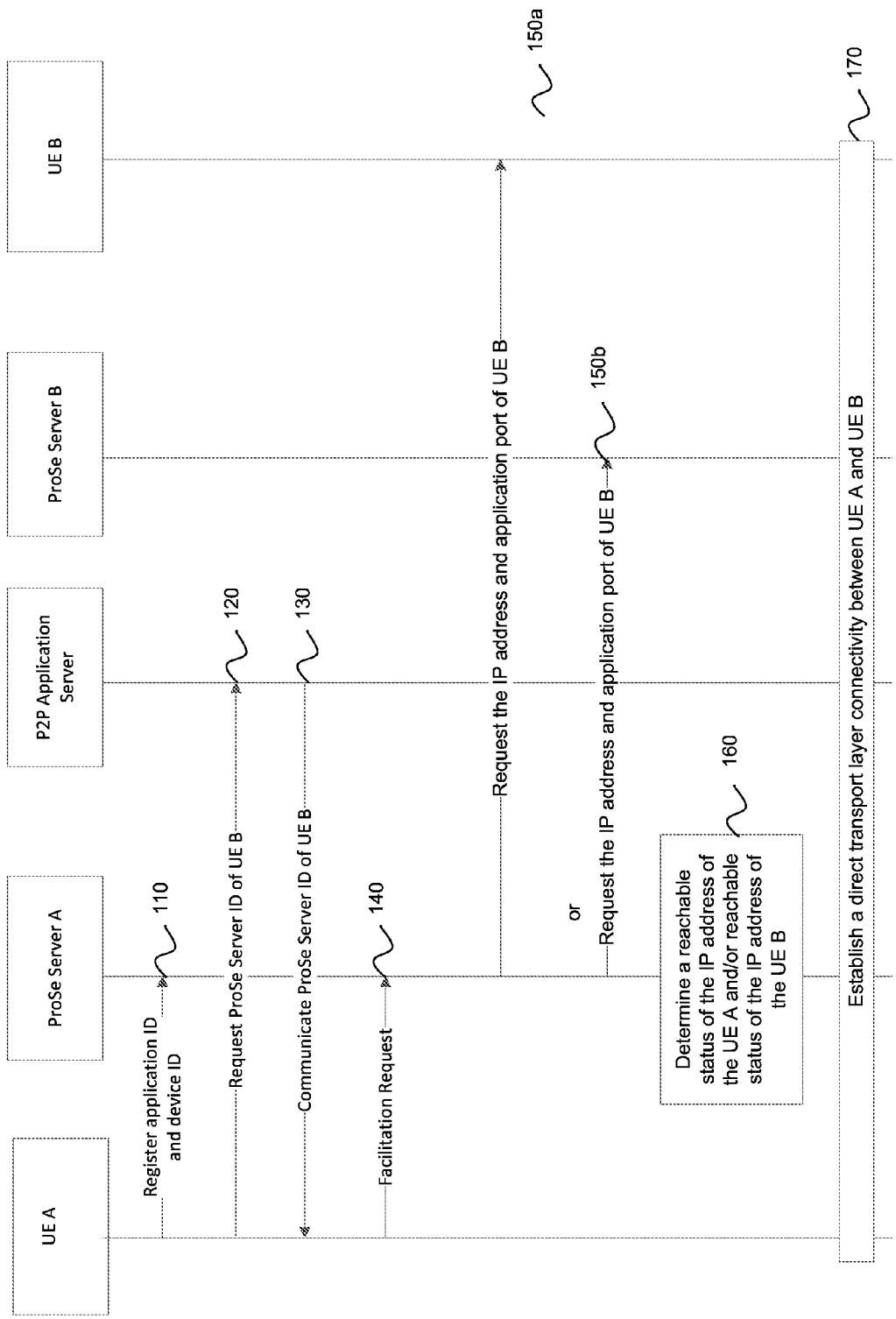
FIG. 1 shows a framework for establishing direct transport layer connectivity between a plurality of devices that are using Internet Protocol (IP) Version 4 (IPv4) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Devices using Internet Protocol version 4 (IPv4) are generally given private IP addresses. Traditionally, the devices with private IP addresses cannot be reached directly by other devices via the internet. Accordingly, to establish direct IP connectivity between a device with a private IP address and another device, the device with the private IP address must first send an IP-level request to the other device in order to open a transport connection on which the other device can return an IP-level response. However, traditionally when both peers have non-routable, private IP addresses direct IP connectivity cannot be established since the initial IP-level request cannot be delivered.

When a device establishes direct IP connectivity with a device that does not have a publicly routable IP address (i.e. a private IP address or a public IP address blocked by a firewall), a direct IP connectivity scheme can be used. In one embodiment, a direct IP connectivity scheme for IPv4 can use a proximity services (ProSe) server, such as a device to device (D2D) server, to establish direct IP connectivity. In one embodiment, the ProSe server can assist devices to discover other devices, establish D2D connections, and maintain D2D service continuity.

FIG. 1 shows a framework for establishing direct transport layer connectivity between a plurality of devices that are using IPv4. In one embodiment, a UE A can register an application identification (ID) and a device ID with a proximity services (ProSe) server A (i.e. the ProSe server in communication with UE A), as in block 110. In another embodiment, UE A can receive user input through a graphical user interface of a selected application running on UE A to initiate registering the application ID and the device ID with the ProSe server A. In another embodiment, UE A can receive user input through a graphical user interface of a selected application to register a peer to peer (P2P) application ID and a ProSe server ID with a P2P application server to advertise offered P2P content to other devices. In another embodiment, UE A can receive user input through a graphical user interface of a selected application to assign access permissions for the offered content (permissions can vary by device or type of device). In another embodiment, to directly connect over a transport layer with UE B using a selected application, UE A can request a ProSe server ID of UE B from a P2P application server with which UE B is registered, as in block 120.

In one embodiment, when access permissions of UE B permit UE A to connect to UE B, the P2P application server communicates to UE A the ProSe server ID of UE B, as in block 130. In another embodiment, the UE A can send a facilitation message to the ProSe server A requesting the ProSe server A facilitate establishing a direct transport layer connection with UE B that is identified using a P2P application layer ID and ProSe server ID of UE B, as in block 140. In another embodiment, the facilitation message can include an IP address of UE A. In another embodiment, when UE B is managed by the same ProSe server as UE A (i.e. ProSe server A), the ProSe server A can send a request for the IP address and application port of UE B directly to UE B, as in block 150a. In another embodiment, if UE B is managed by a ProSe server other than ProSe server A, the ProSe server A can send a request for the IP address and application port of UE B via the ProSe server of UE B (i.e. ProSe server B), as in block 150b. In another embodiment, ProSe server A can determine a reachable status of the IP address of UE A and/or a reachable status of the IP address of UE B, as in block 160. In another embodiment, direct transport layer connectivity can be established between UE A and UE B, as in block 170.

Figure 2:
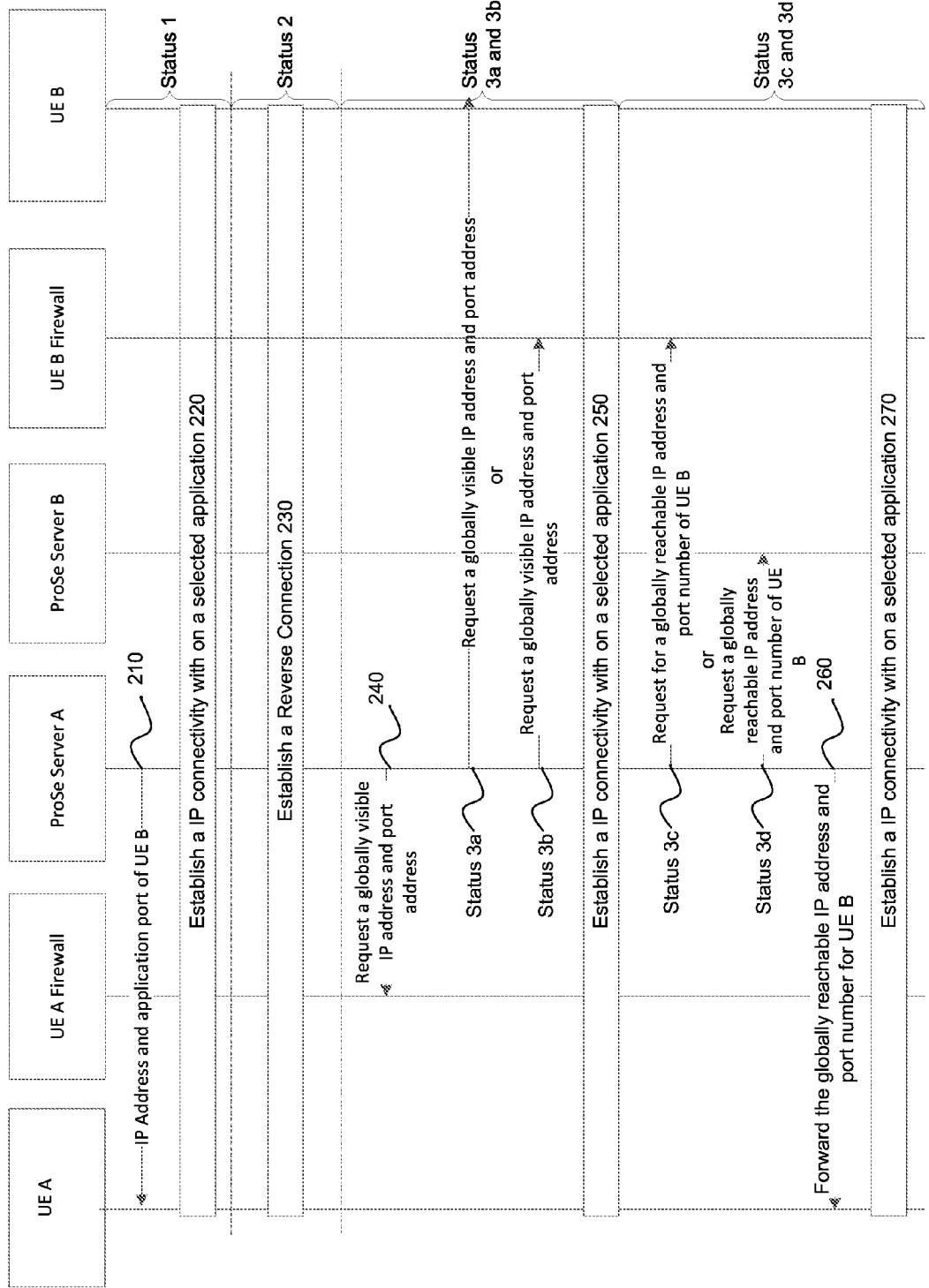
FIG. 2 shows different status frameworks for establishing a direct internet protocol (IP) connection between user equipment (UE) A and UE B in accordance with an example.

FIG. 2 shows different frameworks for establishing a direct IP connection between UE A and UE B based on the reachable status of an IP address of UE A and/or a reachable status of the IP address of UE B. In status 1, UE B has a globally reachable IP address. Additionally, in status 1 the ProSe server of UE A (ProSe Server A) can forward an IP address and an application port of UE B to UE A, as in block 210. In one embodiment, UE A can use the IP address and application port of UE B to establish direct transport layer connectivity or IP connectivity with UE B, as in block 220.

Figure 3:
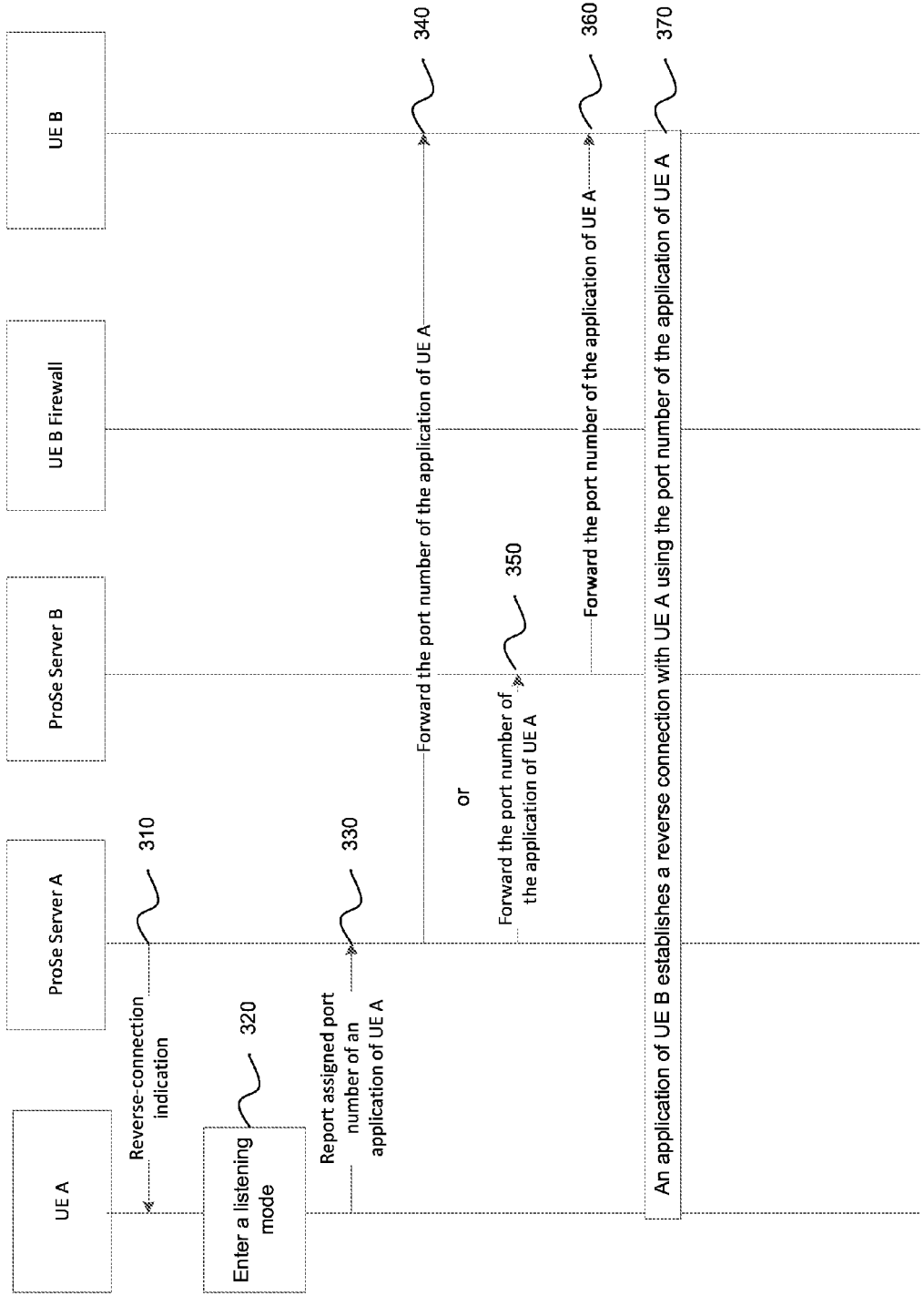
FIG. 3 shows a framework for establishing the reverse connection in accordance with an example.

In status 2, UE B does not have a globally reachable IP address (e.g. UE B is behind a NAT or firewall), but UE A does have a globally reachable IP address. In status 2, a reverse connection may be established between UE A and UE B, as in block 230. FIG. 3 further provides details on establishing a reverse connection.

In status 3, neither UE B nor UE A has a globally reachable IP address. In one embodiment, ProSe server A can request a globally reachable IP address and port number for UE A from the firewall of UE A, as in block 240. In another embodiment, the ProSe server A can forward the IP address and port number directly to UE B when UE B is managed by ProSe server A, as shown in status 3a. In another embodiment, the ProSe server A can forward the IP address and port number indirectly to UE B via a ProSe Server of UE B (i.e. ProSe server B) when UE B is not managed by ProSe server A, as shown in status 3b. In another embodiment, UE B can then use that IP address and port number to establish IP connectivity with UE A on a selected application, as in block 250.

In another embodiment, the ProSe server A can send a request directly to a firewall of UE B (UE B Firewall) for a globally reachable IP address and port number for UE B when UE B is managed by ProSe server A, as in status 3c. In another embodiment, the ProSe server A can send a request to indirectly to UE B Firewall via ProSe server B for a globally reachable IP address and port number for UE B when UE B is not managed by ProSe server A, as in status 3d. In another embodiment, the ProSe server A can forward the globally reachable IP address and port number for UE B to UE A, as in block 260. In another embodiment, UE A can then use the globally reachable IP address and port value to establish IP connectivity with UE B on a selected application, as in block 270. In another embodiment, when the connection is terminated, the firewall rule is removed.

FIG. 3 shows a framework for establishing the reverse connection, as discussed in FIG. 2. In one embodiment, ProSe server A can indicate to the UE A that a reverse-connection will be established from UE B to bypass a NAT and/or a firewall of UE B, as in block 310. In another embodiment, when UE A receives the reverse-connection indication, UE A can enter a listening mode, as in block 320. In another embodiment, when UE A receives the reverse-connection indication, UE A can report to ProSe server A an assigned port number of an application of UE A, as in block 330. In another embodiment, ProSe server A can forward the port number of the application of UE A to UE B. In one example, ProSe server A can directly forward the port number of the application of UE A to UE B, as shown in block 340. In another example, ProSe server A can indirectly forward the port number of an application of UE A to UE B using ProSe server B, as shown in block 350. In another embodiment, ProSe server B can forward the port number of the application of UE A to UE B, as shown in block 360. In another embodiment, when UE B receives the port number of an application of UE A, an application of UE B can establish a reverse connection with UE A using the port number of the application of UE A, as in block 370. In one embodiment, the reverse connection can be a bidirectional socket that can be used by the application of UE A and/or the application of UE B.

Figure 4:
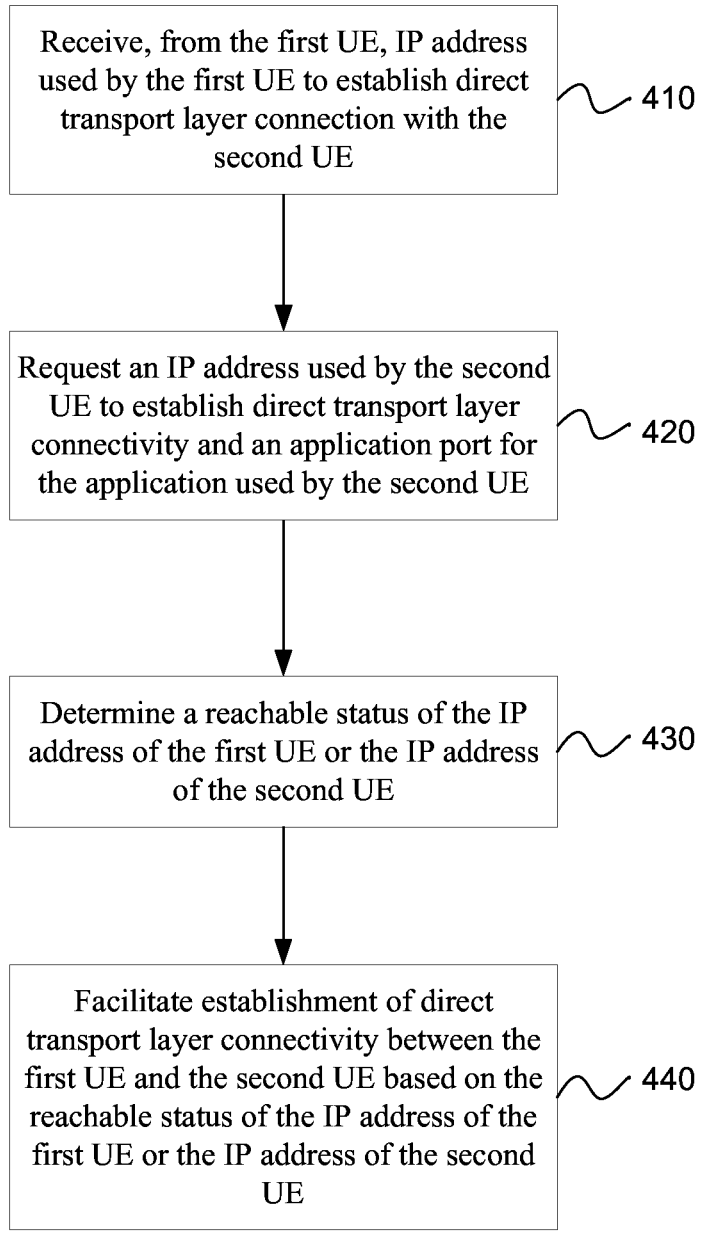
FIG. 4 depicts the functionality of computer circuitry of a proximity services (ProSe) server operable to facilitate establishment of a peer to peer (P2P) connection between a first UE and a second UE in accordance with an example.

FIG. 4 uses a flow chart 400 to illustrate the functionality of one embodiment of the computer circuitry with a ProSe server operable to facilitate establishment of direct transport layer connectivity between a first user equipment (UE) and a second UE. The functionality may be implemented as a method or the functionality may be executed as instructions on a machine, where the instructions are included on at least one computer readable medium or one non-transitory machine readable storage medium. The computer circuitry can be configured to receive, from the first UE, an internet protocol (IP) address used by the first UE to establish direct transport layer connectivity with the second UE, as in block 410. The computer circuitry can be further configured to request an internet protocol (IP) address used by the second UE to establish direct transport layer connectivity and an application port for the application used by the second UE, as in block 420. The computer circuitry can be further configured to determine a reachable status of the IP address of the first UE or the IP address of the second UE, as in block 430. The computer circuitry can be further configured to facilitate establishment of the direct transport layer connectivity between the first UE and the second UE based on the reachable status of the IP address of the first UE or the IP address of the second UE, as in block 440.

In one embodiment, the computer circuitry can be further configured to receive, from the first UE, a facilitation request to establish direct transport layer connectivity between the first UE and the second UE. In another embodiment, the computer circuitry can be further configured to receive, from the first UE, a user application identification (ID) for a peer to peer (P2P) application and a device ID of the first UE. In another embodiment, the computer circuitry can be further configured to identify the second UE using a user application identification (ID) and a ProSe server ID of a ProSe server used by the second UE.

In one embodiment, the reachable status of the IP address for the first UE or IP address for the second UE includes a globally reachable IP address status and a non-globally reachable IP address status. In another embodiment, the non-globally reachable IP address status is caused by the use of a network address translation (NAT) or a firewall by the first UE or the second UE. In another embodiment, the computer circuitry can be further configured to send, to the first UE, the IP address and application port of the second UE when the reachable status of the second UE is a globally reachable IP address status. In another embodiment, the computer circuitry can be further configured to determine that the first UE and the second UE support a reverse-connection procedure and assist the first UE and the second UE to establish reverse-connectivity between the first UE and the second UE when the reachable status of the second UE is a non-globally reachable IP address status and the reachable status of the first UE is a globally reachable IP address status.

In one embodiment, the computer circuitry can be further configured to assist the first UE and the second UE to establish reverse-connectivity by: indicating to the first UE that a reverse-connectivity will be established for the application from the second UE to bypass a firewall of the second UE; forwarding an IP address and a port number of the application for the first UE to the second UE; and directing the second UE to establish a reverse-connectivity for the application with the first UE. In another embodiment, the computer circuitry can be further configured to forward the IP address and port number of the first UE to the second UE directly or forward the IP address and port number of the first UE to the second UE using a ProSe server of the second UE. In another embodiment, the reverse-connectivity between the first UE and the second UE is a bidirectional socket. In one embodiment, the computer circuitry can be further configured to remove the firewall bypass from the second UE when the direct transport layer connectivity for the application between the first UE and the second UE is terminated.

In one embodiment, the computer circuitry can be further configured to directly request a globally reachable IP address and a port number for the second UE from the second UE when the second UE is managed by the ProSe server when the reachable status of the second UE is the non-globally reachable IP address status and reachable status of the first UE is the non-globally reachable IP address status. In one embodiment, the computer circuitry can be further configured to indirectly request a globally reachable IP address and a port number for the second UE using a ProSe server associated with the ProSe server associated with the second UE when the reachable status of the second UE is the non-globally reachable IP address status and reachable status of the first UE is the non-globally reachable IP address status. In another embodiment, the computer circuitry can be further configured to forward the globally reachable IP address and the port number to the first UE.

In one embodiment, the computer circuitry can be further configured to directly request a firewall associated with the second UE to provide the globally reachable IP address for the second UE when the second UE is managed by the ProSe server. In one embodiment, the computer circuitry can be further configured to indirectly request a firewall associated with the second UE via the ProSe server of the second UE to provide the globally reachable IP address for the second UE when the second UE is managed by the ProSe server. In another embodiment, the computer circuitry can be further configured to directly request a firewall associated with the second UE to provide a port through which the first UE can access the second UE for the direct transport connection between the first UE and the second UE. In one embodiment, the computer circuitry can be further configured to indirectly request a firewall associated with the second UE via the ProSe server of the second UE to provide a port through which the first UE can access the second UE for the direct transport connection between the first UE and the second UE.

In one embodiment, the computer circuitry can be further configured to assist the first UE and the second UE in establishing a direct transport connectivity using the globally reachable IP address and the port provided by a firewall associated with the second UE. In another embodiment, the computer circuitry can be further configured to request the globally reachable IP address and the port for the second UE directly from the firewall associated with the second UE or request the globally reachable IP address and the port for the second UE from a ProSe server of the second UE. In one embodiment, the ProSe server of the second UE can forward the request for the globally reachable IP address and the port for the second UE to a firewall of the second UE. In another embodiment, the computer circuitry can be further configured to request the IP address of the second UE and the application port for the application operating on the second UE from the ProSe server in communication with the second UE or directly from the second UE.

Figure 5:
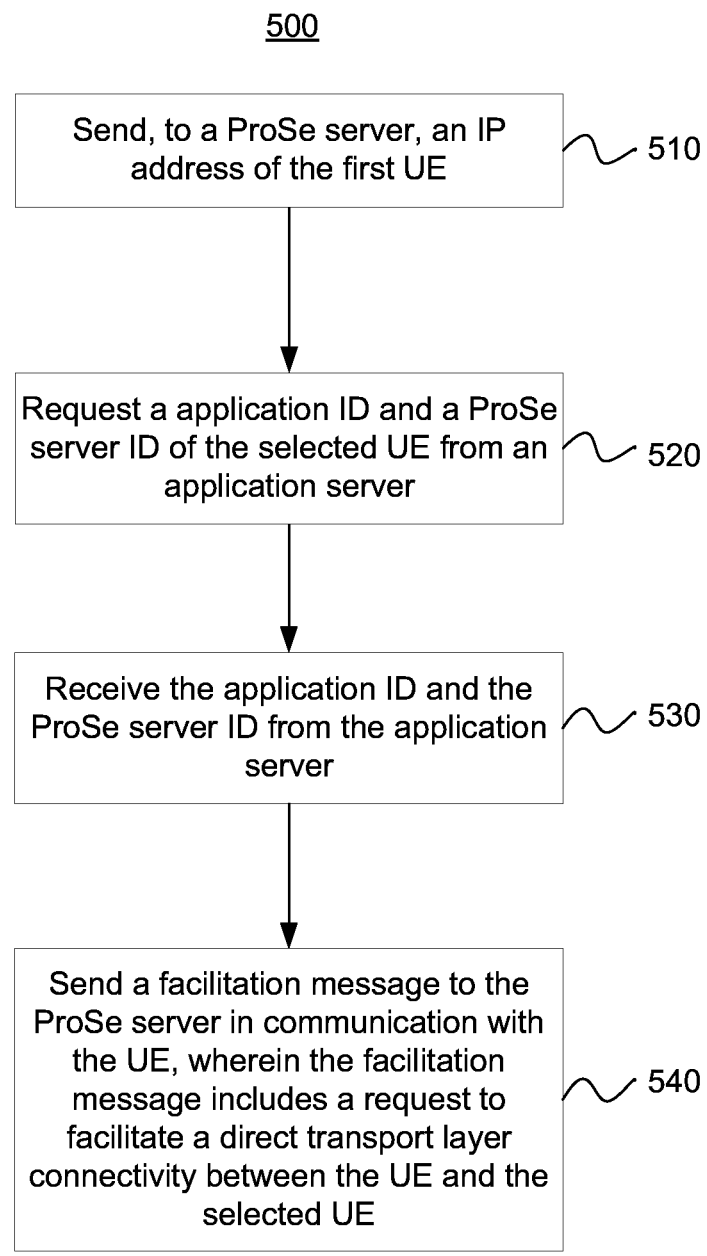
FIG. 5 depicts the functionality of computer circuitry of a UE operable to establish a direct transport layer connection with a selected UE in accordance with an example.

FIG. 5 uses a flow chart 500 to illustrate the functionality of one embodiment of the computer circuitry with a UE operable to establish a direct transport layer connection with a selected UE. The functionality may be implemented as a method or the functionality may be executed as instructions on a machine, where the instructions are included on at least one computer readable medium or one non-transitory machine readable storage medium. The computer circuitry can be configured to send, to a Proximity Services (ProSe) server, an internet protocol (IP) address of the first UE, as in block 510. The computer circuitry can be further configured to request an application identification (ID) (such as a P2P application ID) and a ProSe server ID of the selected UE from an application server, as in block 520. The computer circuitry can be further configured to receive the application ID and the ProSe server ID from the application server, as in block 530. The computer circuitry can be further configured to send a facilitation message to the ProSe server in communication with the UE, wherein the facilitation message includes a request to facilitate direct transport layer connectivity between the UE and the selected UE, as in block 540.

In one embodiment, the computer circuitry can be further configured to send, to the ProSe server, an application identification (ID) for a peer to peer (P2P) application and a device ID of the UE. In another embodiment, the computer circuitry can be further configured to register an application ID and the ProSe server ID with a peer to peer (P2P) Application Server (such as when the UE is configured to provide content or service using the P2P Application Server). In another embodiment, the computer circuitry can be further configured to communicate to a peer to peer (P2P) application server access permission levels for offered content or service posted on the P2P application server. In one embodiment, the server access permission levels indicate which UEs or types of UEs have access to the content/service. In another embodiment, the facilitation message includes an internet protocol (IP) address of the UE.

In one embodiment, the IP address for the first UE or an IP address for the second UE has a reachable status, wherein the reachable status includes a globally reachable IP address status and a non-globally reachable IP address status. In another embodiment, the computer circuitry can be further configured to receive information from a selected UE on a reverse direct transport layer connection between the UE and the selected UE when the reachable status of the selected UE is a non-globally reachable IP address status and the reachable status of the UE is a globally reachable IP address status. In another embodiment, the selected UE can be configured to receive a request to contact the UE to establish a reverse connection. In another embodiment, the computer circuitry can be further configured to receive, from the ProSe server, a globally reachable IP address for the selected UE when the reachable status of the selected UE is the non-globally reachable IP address status and reachable status of the UE is the non-globally reachable IP address status.

Figure 6:
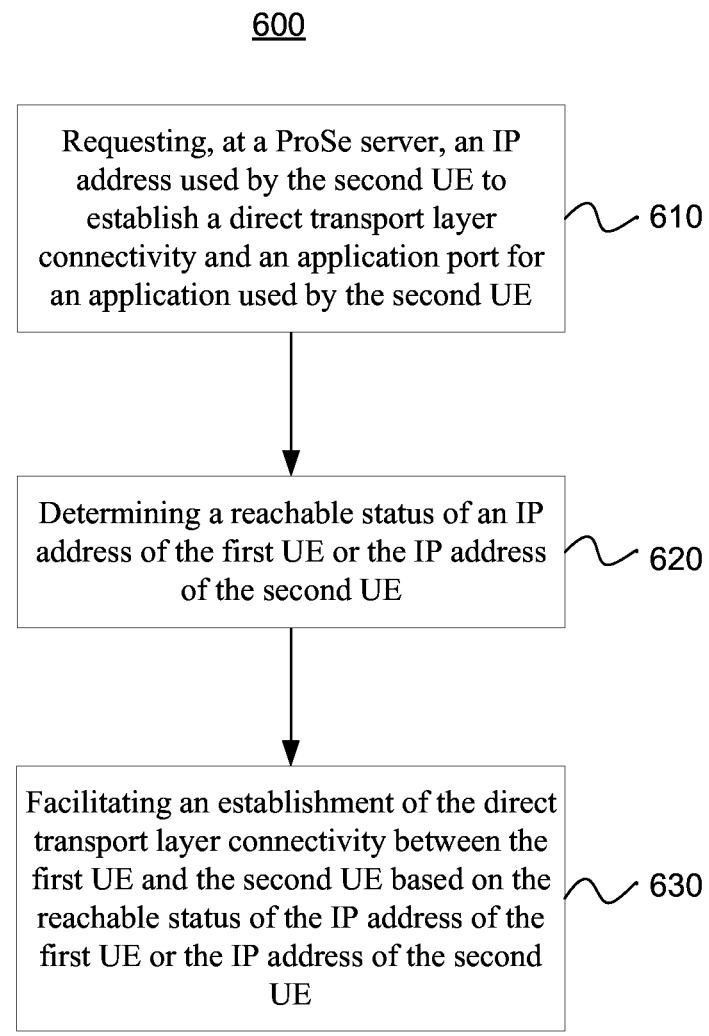
FIG. 6 depicts a product including a non-transitory storage medium having stored thereon instructions that are adapted to be executed to implement a method of facilitating an establishment of a P2P connection between a first UE and a second UE in accordance with an example.

Another example provides functionality 600 of product including a non-transitory storage medium having stored thereon instructions that are adapted to be executed to implement a method of facilitating an establishment of a peer to peer (P2P) connection between a first user equipment (UE) and a second UE, as in the flow chart in FIG. 6. The instructions of the product can be implemented as a method or as instructions on a machine, where the instructions are included on at least one computer readable medium or one non-transitory machine readable storage medium. The method can comprise requesting, at a Proximity Services (ProSe) server, an internet protocol (IP) address used by the second UE to establish direct transport layer connectivity and an application port for an application used by the second UE, as in block 610. The method can further comprise determining a reachable status of an IP address of the first UE or the IP address of the second UE, as in block 620. The method can further comprise facilitating an establishment of the direct transport layer connectivity between the first UE and the second UE based on the reachable status of the IP address of the first UE or the IP address of the second UE, as in block 630.

In one embodiment, the method can further comprise receiving, from the first UE, the IP address used by the first UE to establish the direct transport layer connectivity with the second UE. In another embodiment, the reachable status of the IP address for the first UE or the IP address for the second UE each includes a globally reachable IP address status and a non-globally reachable IP address status. In another embodiment, the method can further determining that the first UE and the second UE support a reverse-connection procedure and facilitating an establishment of a reverse-connection between the first UE and the second UE when the reachable status of the second UE is a non-globally reachable IP address status and the reachable status of the first UE is a globally reachable IP address status. In another embodiment, the method can further comprise requesting a globally reachable IP address for the second UE when the reachable status of the second UE is the non-globally reachable IP address status and reachable status of the first UE is the non-globally reachable IP address status and forwarding the globally reachable IP address to the first UE. In another embodiment, the method can further comprise requesting a globally reachable IP address for the first UE when the reachable status of the first UE and the second UE are a non-globally reachable IP address status and forwarding a globally reachable IP address to the second UE for establishing a reverse transport layer connection.

Figure 7:
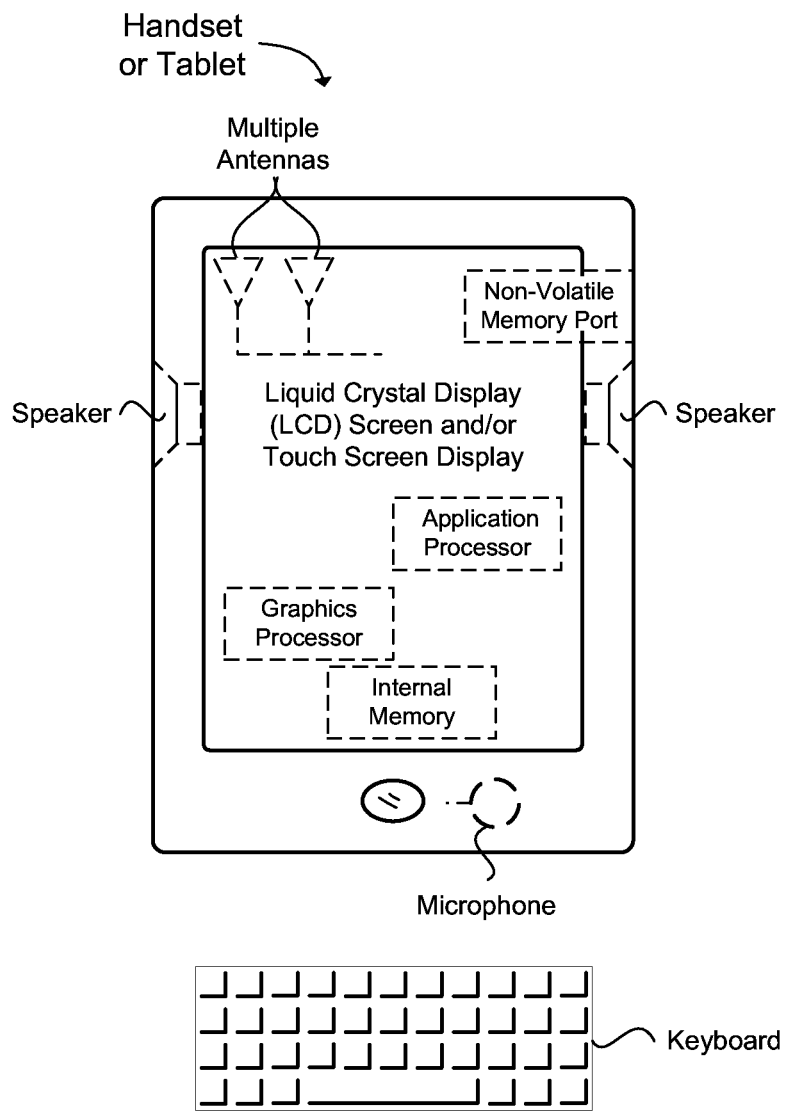
FIG. 7 illustrates a diagram of a UE in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNode B), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program (s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A Proximity Services (ProSe) server operable to facilitate establishment of direct transport layer connectivity between a first user equipment (UE) and a second UE, the ProSe server having computer circuitry configured to:
   receive, from the first UE, an internet protocol (IP) address used by the first UE to establish direct transport layer connectivity with the second UE;
   request an internet protocol (IP) address used by the second UE to establish direct transport layer connectivity and an application port for the application used by the second UE;
   determine a reachable status of the IP address of the first UE or the IP address of the second UE; and
   facilitate establishment of the direct transport layer connectivity between the first UE and the second UE based on the reachable status of the IP address of the first UE or the IP address of the second UE.

2. The computer circuitry of claim 1, further configured to receive, from the first UE, a facilitation request to establish direct transport layer connectivity between the first UE and the second UE.

3. The computer circuitry of claim 1, further configured to receive, from the first UE, a user application identification (ID) for a peer to peer (P2P) application and a device ID of the first UE.

4. The computer circuitry of claim 1, further configured to identify the second UE using a user application identification (ID) and a ProSe server ID of a ProSe server used by the second UE.

5. The computer circuitry of claim 1, wherein the reachable status of the IP address for the first UE or IP address for the second UE includes a globally reachable IP address status and a non-globally reachable IP address status.

6. The computer circuitry of claim 5, wherein the non-globally reachable IP address status is caused by the use of a network address translation (NAT) or a firewall by the first UE or the second UE.

7. The computer circuitry of claim 5, further configured to send, to the first UE, the IP address and application port of the second UE when the reachable status of the second UE is a globally reachable IP address status.

8. The computer circuitry of claim 5, further configured to:
   determine that the first UE and the second UE support a reverse-connection procedure; and
   assist the first UE and the second UE to establish reverse-connectivity between the first UE and the second UE when the reachable status of the second UE is a non-globally reachable IP address status and the reachable status of the first UE is a globally reachable IP address status.

9. The computer circuitry of claim 8, further configured to assist the first UE and the second UE to establish reverse-connectivity by:
   indicating to the first UE that a reverse-connectivity will be established for the application from the second UE to bypass a firewall of the second UE;
   forwarding an IP address and a port number of the application for the first UE to the second UE; and
   directing the second UE to establish a reverse-connectivity for the application with the first UE.

10. The computer circuitry of claim 9, further configured to:
    forward the IP address and port number of the first UE to the second UE directly; or
    forward the IP address and port number of the first UE to the second UE using a ProSe server of the second UE.

11. The computer circuitry of claim 9, further configured to remove the firewall bypass from the second UE when the direct transport layer connectivity for the application between the first UE and the second UE is terminated.

12. The computer circuitry of claim 5, further configured to:
    request a globally reachable IP address and a port number for the second UE when the reachable status of the second UE is the non-globally reachable IP address status and reachable status of the first UE is the non-globally reachable IP address status; and forward the globally reachable IP address and the port number to the first UE.

13. The computer circuitry of claim 12, further configured to:
request a firewall associated with the second UE to provide the globally reachable IP address for the second UE; and
request the firewall associated with the second UE to provide a port through which the first UE can access the second UE for the direct transport connection between the first UE and the second UE.

14. The computer circuitry of claim 12, further configured to assist the first UE and the second UE in establishing a direct transport connectivity using the globally reachable IP address and the port provided by a firewall associated with the second UE.

15. The computer circuitry of claim 12, further configured to:
request the globally reachable IP address and the port for the second UE directly from the firewall associated with the second UE; or
request the globally reachable IP address and the port for the second UE from a ProSe server of the second UE.

16. The computer circuitry of claim 1, further configured to request the IP address of the second UE and the application port for the application operating on the second UE from the ProSe server in communication with the second UE or directly from the second UE.

17. A user equipment (UE) operable to establish direct transport layer connectivity with a selected UE, the UE having computer circuitry configured to:
send, to a Proximity Services (ProSe) server, an internet protocol (IP) address of the UE, wherein the UP address of the UE or an IP address of the selected UE has a reachable status;
request an application identification (ID) and a ProSe server ID of the selected UE from an application server;
receive the application ID and the ProSe server ID from the application server; and
send a facilitation message to the ProSe server in communication with the UE, wherein the facilitation message includes a request to facilitate direct transport layer connectivity between the UE and the selected UE, wherein the ProSe server is configured to facilitate the direct transport layer connectivity based on the reachable status of the IP address of the first UE or the IP address of the second UE.

18. The computer circuitry of claim 17, further configured to send, to the ProSe server, an application identification (ID) for a peer to peer (P2P) application and a device ID of the UE.

19. The computer circuitry of claim 17, further configured to register an application ID and the ProSe server ID with a peer to peer (P2P) Application Server.

20. The computer circuitry of claim 17, further configured to communicate to a peer to peer (P2P) application server access permission levels for offered content or service posted on the P2P application server.

21. The computer circuitry of claim 17, wherein the facilitation message includes an internet protocol (IP) address of the UE.

22. The computer circuitry of claim 17, wherein the reachable status includes a globally reachable IP address status and a non-globally reachable IP address status.

23. The computer circuitry of claim 22, further configured to receive information from a selected UE on a reverse direct transport layer connection between the UE and the selected UE when the reachable status of the selected UE is a non-globally reachable IP address status and the reachable status of the UE is a globally reachable IP address status.

24. The computer circuitry of claim 22, further configured to receive, from the ProSe server, a globally reachable IP address for the selected UE when the reachable status of the selected UE is the non-globally reachable IP address status and reachable status of the UE is the non-globally reachable IP address status.

25. A computer program product including a non-transitory storage medium having stored thereon instructions that are adapted to be executed to implement a method of facilitating an establishment of a peer to peer (P2P) connection between a first user equipment (UE) and a second UE, the method comprising:
requesting, at a Proximity Services (ProSe) server, an internet protocol (IP) address used by the second UE to establish direct transport layer connectivity and an application port for an application used by the second UE;
determining a reachable status of an IP address of the first UE or the IP address of the second UE; and
facilitating an establishment of the direct transport layer connectivity between the first UE and the second UE based on the reachable status of the IP address of the first UE or the IP address of the second UE.

26. The computer program product of claim 25, the method further comprising receiving, from the first UE, the IP address used by the first UE to establish the direct transport layer connectivity with the second UE.

27. The computer program product of claim 25, wherein the reachable status of the IP address for the first UE or the IP address for the second UE each includes a globally reachable IP address status and a non-globally reachable IP address status.

28. The computer program product of claim 27, the method further comprising:
determining that the first UE and the second UE support a reverse-connection procedure; and
facilitating an establishment of a reverse-connection between the first UE and the second UE when the reachable status of the second UE is a non-globally reachable IP address status and the reachable status of the first UE is a globally reachable IP address status.

29. The computer program product of claim 27, the method further comprising:
requesting a globally reachable IP address for the second UE when the reachable status of the second UE is the non-globally reachable IP address status and reachable status of the first UE is the non-globally reachable IP address status; and
forwarding the globally reachable IP address to the first UE.

30. The computer program product of claim 25, the method further comprising:
requesting a globally reachable IP address for the first UE when the reachable status of the first UE and the second UE are a non-globally reachable IP address status; and
forwarding a globally reachable IP address to the second UE for establishing a reverse transport layer connection.

* * * * *